US012654236B2

(12) United States Patent
Gey

(10) Patent No.: US 12,654,236 B2
(45) Date of Patent: Jun. 16, 2026

(54) CUTTING TOOL WITH INDICATOR SUBSTANCE

(71) Applicant: KENNAMETAL INC., Latrobe, PA (US)

(72) Inventor: Christoph Gey, Neuhausen (CH)

(73) Assignee: KENNAMETAL INC., Latrobe, PA (US)

( * ) Notice: Subject to any disclaimer, the term of this patent is extended or adjusted under 35 U.S.C. 154(b) by 647 days.

(21) Appl. No.: 18/107,174

(22) Filed: Feb. 8, 2023

(65) Prior Publication Data

US 2023/0264271 A1 Aug. 24, 2023

(30) Foreign Application Priority Data

Feb. 18, 2022 (DE) .............................. 102022103902

(51) Int. Cl.
| *B23B 49/00* | (2006.01) |
| *B23B 27/16* | (2006.01) |
| *B23B 51/06* | (2006.01) |

(52) U.S. Cl.
CPC ........... *B23B 49/001* (2013.01); *B23B 27/16* (2013.01); *B23B 2228/10* (2013.01); *B23B 2228/48* (2013.01)

(58) Field of Classification Search
CPC ............ B23B 2228/10; B23B 2228/48; B23B 2260/144; B23B 27/16; B23B 27/14; B23B 49/001; B23B 51/00; B23B 51/003; B23B 51/02; B23B 51/068; B23C 5/006; B23C 5/16; B23Q 17/0957; B23Q 11/00
See application file for complete search history.

(56) References Cited

U.S. PATENT DOCUMENTS

| | | | | |
|---|---|---|---|---|
| 2,575,173 A | * | 11/1951 | Johnson ................... | E21B 47/00 |
| | | | | 175/50 |
| 2,657,909 A | * | 11/1953 | Bielstein ................. | E21B 12/02 |
| | | | | 175/317 |
| 2,658,724 A | * | 11/1953 | Arps ....................... | E21B 47/00 |
| | | | | 73/152.19 |
| 3,077,802 A | * | 2/1963 | Philip ....................... | D01F 4/00 |
| | | | | 83/16 |
| 3,571,877 A | * | 3/1971 | Zerkle ................ | B23Q 11/1046 |
| | | | | 407/11 |
| 5,829,926 A | * | 11/1998 | Kammermeier ... | B23Q 11/1023 |
| | | | | 408/59 |
| 2011/0290560 A1* | | 12/2011 | Buske ..................... | E21B 12/02 |
| | | | | 175/39 |
| 2015/0298221 A1* | | 10/2015 | Ach .......................... | B23C 5/28 |
| | | | | 407/11 |
| 2021/0079734 A1* | | 3/2021 | Azrak Fruet ........... | E21B 10/60 |

FOREIGN PATENT DOCUMENTS

| | | | | | | |
|---|---|---|---|---|---|---|
| GB | 2193453 A | * | 2/1988 | ............. | B23Q 11/10 |
| KR | 101742947 B1 | * | 6/2017 | ......... | B23B 51/0453 |
| WO | WO-2015117079 A1 | * | 8/2015 | ......... | B23Q 11/1015 |

OTHER PUBLICATIONS

Nov. 22, 2024 Foreign Office Action Chinese Application No. CN202310141315.7, P22-06602-CN-NP, 2 Pages.

* cited by examiner

*Primary Examiner* — Nicole N Ramos
(74) *Attorney, Agent, or Firm* — Christopher J. Owens

(57) ABSTRACT
The invention relates to a cutting tool having at least one cavity arranged in the cutting tool, spaced apart from an outer contour of the cutting tool by a wear layer, wherein a thickness of the wear layer corresponds to a wear limit of the cutting tool, wherein an indicator substance is arranged in the cavity.

15 Claims, 5 Drawing Sheets

Fig. 8

CUTTING TOOL WITH INDICATOR SUBSTANCE

RELATED APPLICATION DATA

The present application claims priority pursuant to 35 U.S.C. § 119(a) to German Patent Application Number 102022103902.1 filed Feb. 18, 2022 which is incorporated herein by reference in its entirety.

FIELD

The invention relates to a cutting tool.

BACKGROUND

Typically, cutting tools are used for the machining of workpieces. Through direct contact with the workpiece to be machined, a cutting tool wears over time. If wear on a cutting tool has progressed to the point that it can no longer perform its function properly, this cutting tool will typically need to be replaced.

Because a worn-out cutting tool can no longer fully perform its task and can even damage the surface of the workpiece to be machined, it is desirable to detect the wear of a cutting tool in a timely manner. If the operator recognizes the wear in a timely manner, he or she can undertake timely countermeasures, such as regrinding or replacing the cutting tool.

To reliably determine the wear of a cutting tool, the cutting tool suspected of wear can be structurally assessed under an optical light microscope. In this way, possible damage to the chipping surface, free surface, or cutting edges can be detected. However, the assessment under such a microscope is time-consuming and thus cost-intensive. In addition, the correct time of the assessment must be selected by an operator. However, this time is different depending on the use of the cutting tool and cannot always be clearly determined in advance. Furthermore, the microscopic assessment requires the removal of the cutting tool, which is also a time-consuming and thus cost-intensive process.

Consequently, it is desirable to determine the wear of a cutting tool during operation in a simple and inexpensive manner.

One option is the use of wear indicators. Known in the prior art, these are installed, for example, on drill heads that are configured for oil drilling.

US 2011/0290560 A1 and US 2021/0079734 A1 disclose wear indicators for such drill heads. These include a drill head having a cutting surface and a channel arranged below the cutting surface. Due to wear, the cutting surface can be removed and the channel can be opened so that any drilling fluid flowing through the drill head can exit the drill head via the now open channel. This changes at least one characteristic of the flow of drilling fluid that can be detected by a sensor unit on an oil platform connected to the drill head. However, this wear detection method is not very space-saving, is effort-intensive in terms of equipment, and is therefore not suitable for every cutting tool. In particular, this method cannot be readily applied to smaller-sized cutting tools that are used for the machining of workpieces.

SUMMARY

The invention therefore addresses the problem of determining the wear of a cutting tool in a cost-effective and simple manner.

The problem is solved according to the invention by a cutting tool according to claim 1.

Advantageous embodiments of the cutting tool according to the invention are specified in the subclaims, which can optionally be combined with one another.

According to the invention, the problem is solved by a cutting tool having at least one cavity arranged in the cutting tool, spaced apart from an outer contour of the cutting tool by a wear layer, wherein a thickness of the wear layer corresponds to a wear limit of the cutting tool, wherein an indicator substance is arranged in the cavity.

The invention is based on the core concept of arranging a cavity in a cutting tool that is opened upon sufficient wear of the cutting tool, such that an indicator substance located in the cavity is released. The released indicator substance typically falls on the cutting tool itself or on a workpiece machined by the cutting tool and signals to a cutting tool operator that a wear limit of the cutting tool has been reached. The operator can therefore replace the cutting tool if it is indeed worn to the point that replacement is necessary. Conversely, the cutting tool is prevented from being replaced prematurely.

The invention is not limited with respect to the indicator substance. Typically, all materials known in the prior art can be used for the indicator substance, as long as they are suitable for clearly identifying a wear on the cutting tool. Moreover, the indicator substance should be easily removable from the cutting tool and the workpiece after one release.

The indicator substance can be a solid, in particular a powder, or a liquid.

It is particularly advantageous when the type of indicator substance is selected such that it bonds well to a metal surface. This can ensure that the indicator substance does not become volatilized and stick to the cutting tool or workpiece after release.

It has also been found to be further advantageous when the indicator substance comprises a highly coloring substance, such that the operator can detect with the naked eye that there is wear.

According to one aspect, the indicator substance is selected from the group consisting of dyes, pigments, soot, and luminescent paints, as well as combinations thereof.

Preferably, the substances mentioned above are selected so as to be different from the color/appearance of the workpiece and cutting tool.

According to a preferred aspect, the indicator substance comprises at least one dye.

In principle, the indicator substance is not limited with respect to the dye; rather, all dyes known in the prior art can be used.

For example, a metallic glossy cutting tool can use a red dye that, when released, colors the cutting tool red.

In particular, food dyes are used as the colorants.

Suitable examples of food dyes include titanium dioxide, iron oxide, iron hydroxide, carotene, and lycopene, as well as combinations thereof.

Of course, other dyes can also be used. For example, solvent dyes that form solutions with organic solvents such as alcohols, esters, or hydrocarbons can be used.

In particular, Sudan dyes or Zapon dyes can be used as the solvent dyes.

In particular, inorganic pigments are used as the pigments.

Suitable examples of pigments include spinel pigments, hematite pigments, mixed phase oxide pigments, bismuth pigments, iron oxide pigments, and ultramarine, as well as combinations thereof.

In particular, inorganic luminescent paints are used as the luminescent paints. Preferably, luminescent paints are used that emit in the visible range of the spectrum.

For example, copper-doped zinc sulfide can be used as the luminescent paint.

The group of indicator substances described above offers the technical advantage that, when released, they clearly stain the cutting tool or the workpiece in a recognizable manner for the operator. Thus, the wear of a tool can be easily indicated.

In a further embodiment, the indicator substance is present in a liquid.

The invention is not limited with respect to the liquid. In principle, all conventional liquids in the prior art can be used.

The indicator substance can form a solution, emulsion, or dispersion with the liquid.

In an emulsion, the indicator substance can be a constituent of both a dispersed phase or a continuous phase. In principle, the indicator substance can also be present simultaneously in both phases. In addition, the emulsion can be an oil-in-water or a water-in-oil emulsion. The emulsion can be surfactant-free or can contain a surfactant, as needed. All surfactants known in the prior art can be used as the surfactant.

Preferably, the indicator substance forms a solution with the liquid, preferably a saturated solution.

In particular, water can be used as the liquid. Water has the advantage that it is a good solvent for various dyes and luminescent paints. In addition, water is hydrophilic and forms a very low contact angle on metal surfaces. Thus, an aqueous solution with the indicator substance can wet a metallic surface well, such that as large a surface as possible is brought into contact with the indicator substance.

In particular, the liquid can be a cooling fluid. Thus, a combination of the cooling fluid and the indicator substance performs a dual function. On the one hand, the cutting tool can be cooled by the cooling fluid, and on the other hand, a wear limit of the cutting tool can be indicated by the indicator substance.

The invention is not limited with respect to the formation of the cavity. The cavity can have any shape and geometry as long as it can be placed in a cutting tool and does not compromise the structural integrity of the cutting tool.

For example, the cavity can be produced by additive manufacturing, also known as 3D printing, of the cutting tool. For additive manufacturing, established methods such as selective laser melting or binder jetting can be used, among other things.

According to a further aspect, it is provided that the cavity is configured as a channel.

The configuration of the cavity in the form of a channel offers the technical advantage that a single cavity can cover a wide area of the surface or the outer contour.

In a further embodiment, the cavity has a porous structure, in particular a porous honeycomb-like structure.

The formation of a porous structure, particularly a porous honeycomb-like structure, provides the technical advantage that the surface of the cavity can be increased while maintaining a consistent volume. In addition, such a cavity has pores that can be specifically loaded with the indicator substance. A cutting tool having a porous cavity also has higher structural integrity than a comparable cutting tool with an "empty" cavity.

According to a further aspect, it is provided that the cavity in the cutting tool is designed to be open.

An open cavity is understood to mean that the cavity is fluidly connected to further hollow portions in the cutting tool.

An open cavity has the advantage that it can be variably connected to different apparatuses and sensors.

In a further embodiment, the open cavity is connected to an indicator source, which is configured so as to supply the cavity with indicator substance.

Preferably, the indicator source is arranged outside the cutting tool.

For example, the indicator source can be associated with a tool holder or a machine.

An indicator source advantageously provides an indicator substance under a certain pressure, such that, upon wear, the indicator substance is actively pumped out of the cutting tool. Thus, an open cavity that is fluidly connected to an indicator source is no longer limited to the volume of the individual cavity. Accordingly, a greater amount of indicator substance can be released, which can be more easily detected by an operator.

According to a further aspect, it is provided that the cavity is closed.

A closed cavity is understood to mean that the cavity has no internal or external openings. Such a cavity can in a sense be considered a "cavity" in the cutting tool.

A closed cavity offers the technical advantage that, by contrast to an open cavity, it does not require the supply of an indicator source. The source is thus omitted. A cutting tool having a closed cavity is thus inexpensive.

In a further embodiment, the cutting tool comprises at least one cutting edge and a cutting surface. Advantageously, it is provided that the cavity is associated with the cutting edge and/or the cutting surface. Thus, the wear is detected directly on the most stressed portions of the cutting tool, i.e., the cutting surface and the cutting edge.

A cutting edge is understood to mean all edges of a cutting tool, in particular the main cutting edge, side cutting edge, and cutting corner.

In particular, the term "cutting surface" includes the free surface and the chipping surface.

In an advantageous embodiment, the cavity associated with a cutting edge contains a different indicator substance than the cavity associated with a cutting surface.

This allows the wear of a cutting edge to be easily distinguished from that of a cutting surface without having to examine it under a microscope. For example, the cavity associated with a cutting edge can contain a red dye and the cavity associated with a cutting surface can contain a blue dye.

In a further embodiment, a plurality of cutting edges and cavities are provided, wherein at least one cavity is associated with each cutting edge.

In a further embodiment, a plurality of cutting surfaces and a plurality of cavities are provided, wherein at least one cavity is associated with each cutting surface.

The two embodiments mentioned above offer the technical advantage that the wear of individual cutting surfaces and cutting edges can be specifically detected.

According to a further aspect of the invention, the cutting tool is modularly constructed and comprises a cutting insert in which the cavity is provided.

In case of wear of the modular cutting insert, an indicator substance is released, as already described above. Thus, the worn cutting insert can either be tipped or completely replaced in order to regain a properly functioning cutting tool.

The cutting insert can in particular be a tipped cutting plate or a drill head.

BRIEF DESCRIPTION OF THE DRAWINGS

The invention will be described in further detail below with reference to the accompanying drawings, using exemplary embodiments. The drawings show:

FIG. 8 in a schematic cross-sectional view, a modular cutting tool having an open honeycomb-like cavity.

DETAILED DESCRIPTION

Figures 1, 2:
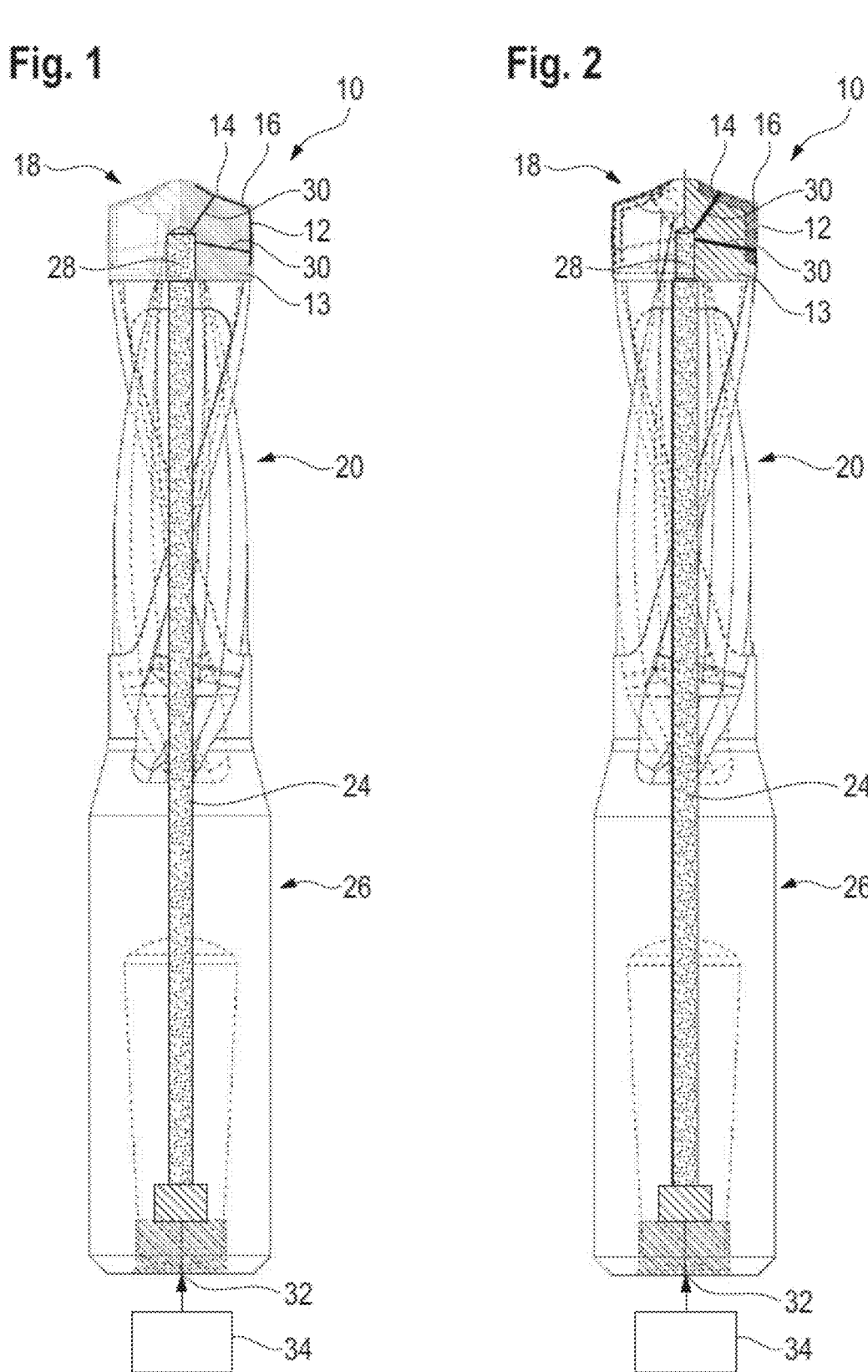
FIG. 1 in a schematic cross-sectional view, a cutting tool according to the invention having an open, channel-like cavity.
FIG. 2 in a schematic cross-sectional view, a cutting tool according to the invention having an open, porous, honeycomb-like cavity.

FIG. 1 shows a cutting tool 10 for performing rotating cutting operations on a workpiece (not shown).

The cutting tool described in FIG. 1 and in the following figures is merely exemplary. Generally, the cutting tool can be any cutting tool known in the prior art, such as a milling machine, a cutting plate, or a rotary tool.

In the illustrated embodiment, the cutting tool 10 is of the spiral drill type and has helical grooves arranged along the sides of the drill.

The cutting tool 10 comprises a drill head 18 configured integrally with a shaft 20.

The shaft 20 has an elongated shape with two opposite ends, wherein the shaft 20 opens into the drill head 18 at one end and a tool holder 26 is arranged at the other end. The shaft 20 thereby engages with and is locked to the tool holder 26.

The drill head 18 has an outer contour 14 that corresponds to the surface of the drill head 18.

According to the invention, the drill head 18 comprises a cavity 12.

The cavity 12 is located in the cutting body 13 of the drill head 18.

The cavity 12 is spaced apart from the outer contour 14 by a wear layer 16.

In this embodiment, the cavity 12 is channel-like in form and extends from the tip of the drill head 18 in the direction of its lateral end.

An indicator substance (not shown here) is arranged in the cavity 12.

The indicator substance is preferably selected from the group consisting of dyes, pigments, soot, and luminescent paints, as well as combinations thereof.

For example, for the cutting tool from FIG. 1, a dye can be used that is dissolved in an aqueous or organic medium and that has a strong signaling effect on a user. Red, yellow, or orange dyes are particularly suitable for this purpose.

The channel-like cavity 12 is fluidly connected to a distribution chamber 28 arranged proximally in the drill head 18 by way of two connecting channels 30.

The connecting channels 30 extend from the proximally arranged distribution chamber 28 to the distally arranged cavities 12.

The distribution chamber 28 is fluidly connected to a supply rod 24. The supply rod extends from the distribution chamber 28 through the shaft 20 and opens into the tool holder 26.

The supply rod 24 is evenly spaced apart from the outer wall of the shaft 20 and tool holder 26.

The supply rod 24 has an end opposite the distribution chamber 28, which end is formed by an inlet opening 32.

The inlet opening 32 can be connected to an indicator source 34 arranged outside the cutting tool 10. In particular, the indicator source 34 can be arranged within a machine tool that drives the cutting tool 10 during the machining operation.

During operation of the cutting tool 10, the indicator source 34 provides the aforementioned indicator substance, which flows into the supply rod 24 via the inflow opening 32. Via the supply rod 24, the indicator substance passes into the distribution chamber 28 and subsequently into the connecting channels 30 and thus into the cavities 12 arranged distally in the drill head 18.

The wear of the cutting tool 10 from FIG. 1 will be explained in further detail below.

During operation, the cutting tool 10 performs rotating cutting operations on a workpiece, thereby causing wear on the outer contour 14 of the drill head 18. As a result of the wear, the wear layer 16 is removed and the cavity 12 is opened. It is sufficient for the wear layer 16 to be removed in at least one place. Uneven wear therefore also results in the cavity 12 being opened in at least one place. The cavity contains an indicator substance that is released into the environment of the cutting tool 10. As a result, the environment and the cutting tool 10, in particular the drill head 18, at least partially come into contact with the indicator substance. In addition, the indicator source 34 can pump a certain amount of indicator substance back so that sufficient indicator substance is released in order to recognize the wear. The operator receives the information that the wear limit of the cutting tool 10 has been reached. Operation can be suspended and the cutting tool 10 can be replaced. A time-consuming and cost-intensive inspection under a microscope can thus be avoided.

FIG. 2 shows the cutting tool 10 from FIG. 1, with the difference that the cavity 12 is configured so as to be honeycomb-like.

With respect to the other features and parts, the same statements apply as those already made in FIG. 1.

Figure 3:
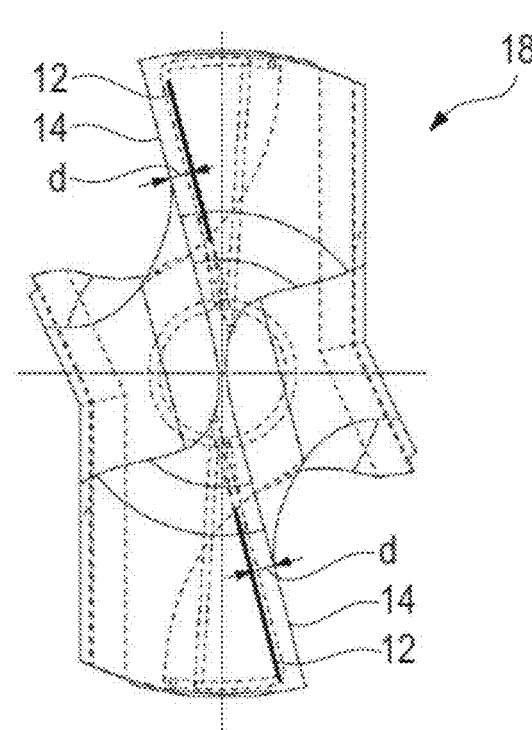
FIG. 3 in a schematic aerial view, a drill head from FIG. 1.

FIG. 3 shows an aerial view of the drill head 18 from FIG. 1.

As can be readily seen in FIG. 3, the channel-like cavity 12 is spaced from the outer contour 14 of the drill head 18 by a wear layer 16. The wear layer 16 has a thickness d. The thickness d of the wear layer 16 corresponds to a wear limit of the cutting tool 10.

Figure 4:
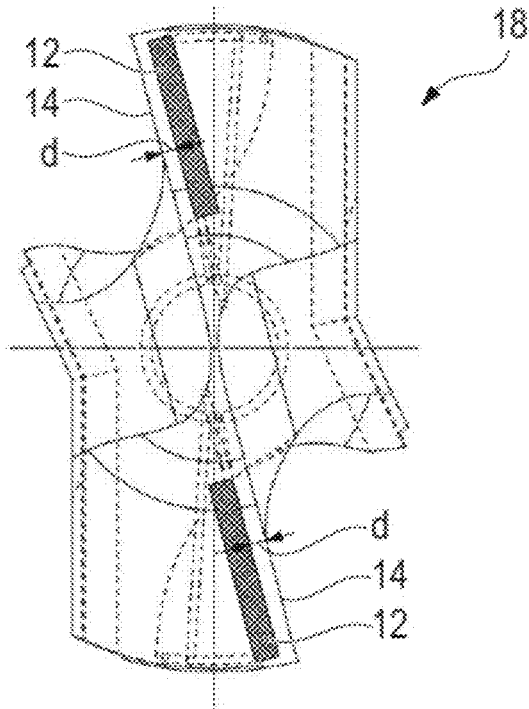
FIG. 4 in a schematic aerial view, a drill head from FIG. 2.

FIG. 4 shows an aerial view of the drill head 18 from FIG. 2. The thickness d shown in FIG. 4 also corresponds to the thickness d of the wear layer 16.

Figure 5:
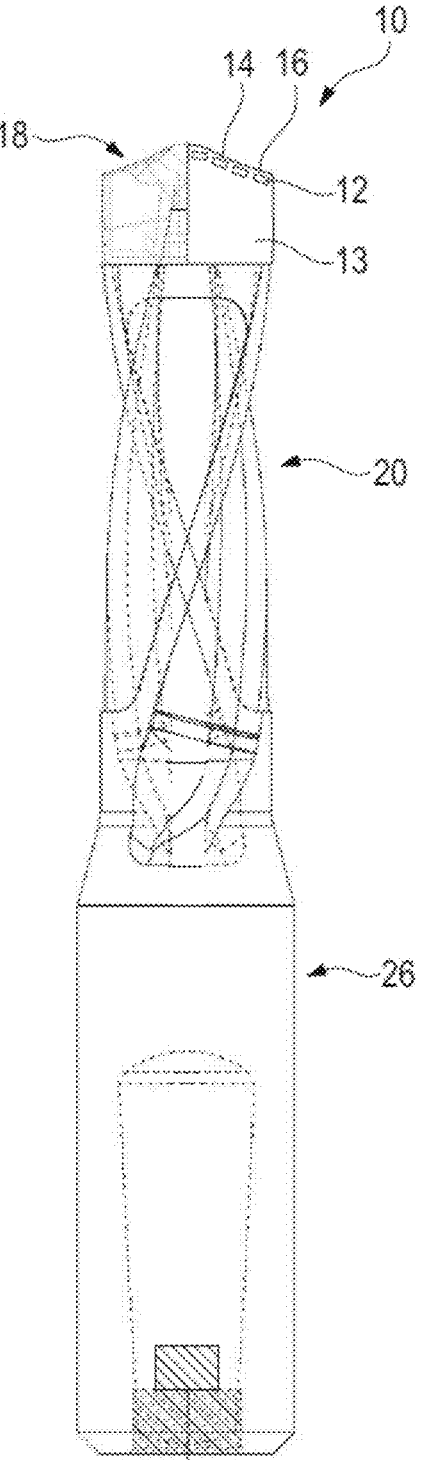
FIG. 5 in a schematic cross-sectional view, a cutting tool according to the invention having a plurality of closed cavities.

FIG. 5 shows the cutting tool 10 from FIG. 1, with the difference that a plurality of cavities 12 are arranged in the drill head 18 and are configured so as to be closed. Thus, the connecting channels 30, the distribution chamber 28, the indicator source 34, and the supply rod 24 are omitted.

Moreover, the cutting tool 10 from FIG. 5 contains the same components and features as already described in FIG. 1.

The cavities 12 shown in FIG. 5 are configured so as to be closed, as already described above. In other words, the cavities 12 are not cross-linked with one another.

The plurality of cavities 12 each contain an amount of the indicator substance (not shown here).

The indicator substance is preferably selected from the group consisting of dyes, pigments, soot, and luminescent paints, as well as combinations thereof.

Figure 6:
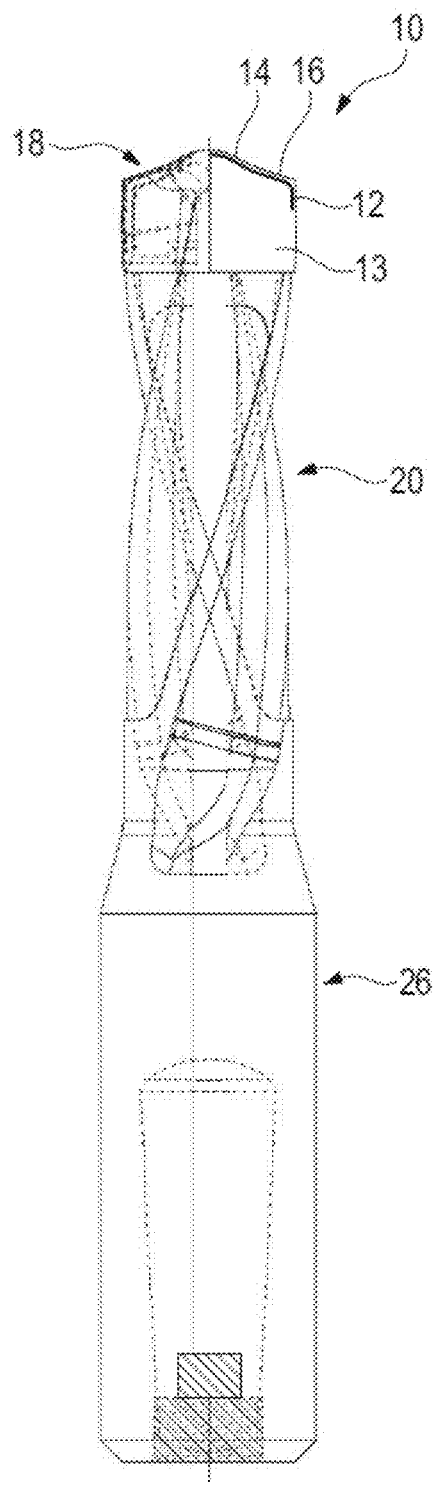
FIG. 6 in a schematic cross-sectional view, a cutting tool according to the invention having a closed channel-like cavity.

FIG. 6 discloses the cutting tool 10 from FIG. 5 with a channel-like design of the cavity 12. Otherwise, FIG. 6 contains the same components as already described in FIG. 5.

Figure 7:
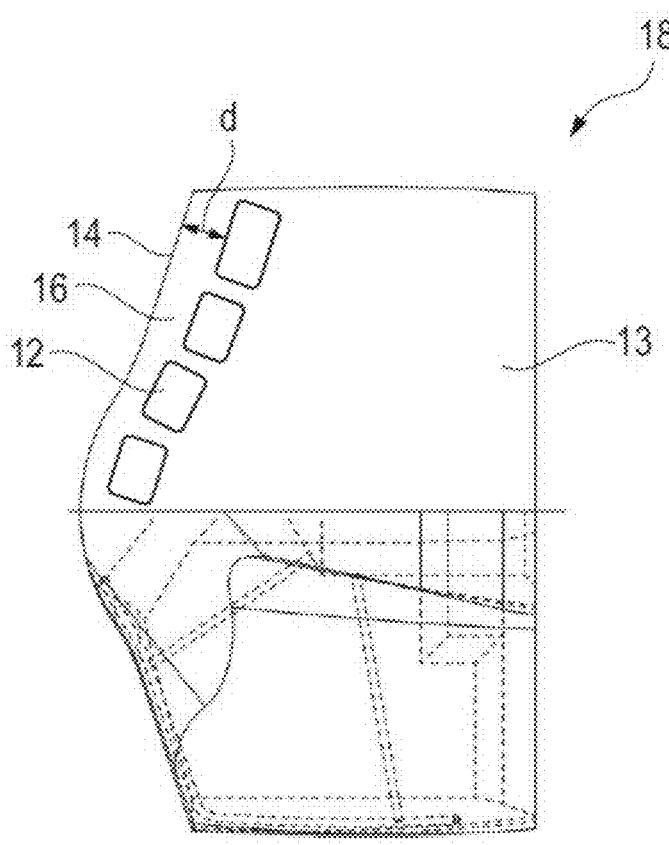
FIG. 7 in a schematic cross-sectional view, the drill head from FIG. 5.

FIG. 7 shows a cross-sectional view of the drill head 18 from FIG. 5.

As can be seen in FIG. 7, the closed cavities 12 are each spaced apart from the outer contour 14 of the drill head 18 by a wear layer 16 having the thickness d.

The cavities 12 are also embedded in the cutting body 13.

The wear layer 16 corresponds to a wear limit of the cutting tool 10. In other words, if the wear layer is selected larger, the wear of the cutting tool 10 is indicated only after an extended period of operation. Conversely, if the wear layer 16 is reduced, the operating time after which wear is indicated is also reduced. Thus, depending on the application, a specific operating time of the cutting tool can be specified by the thickness d.

Figure 8:
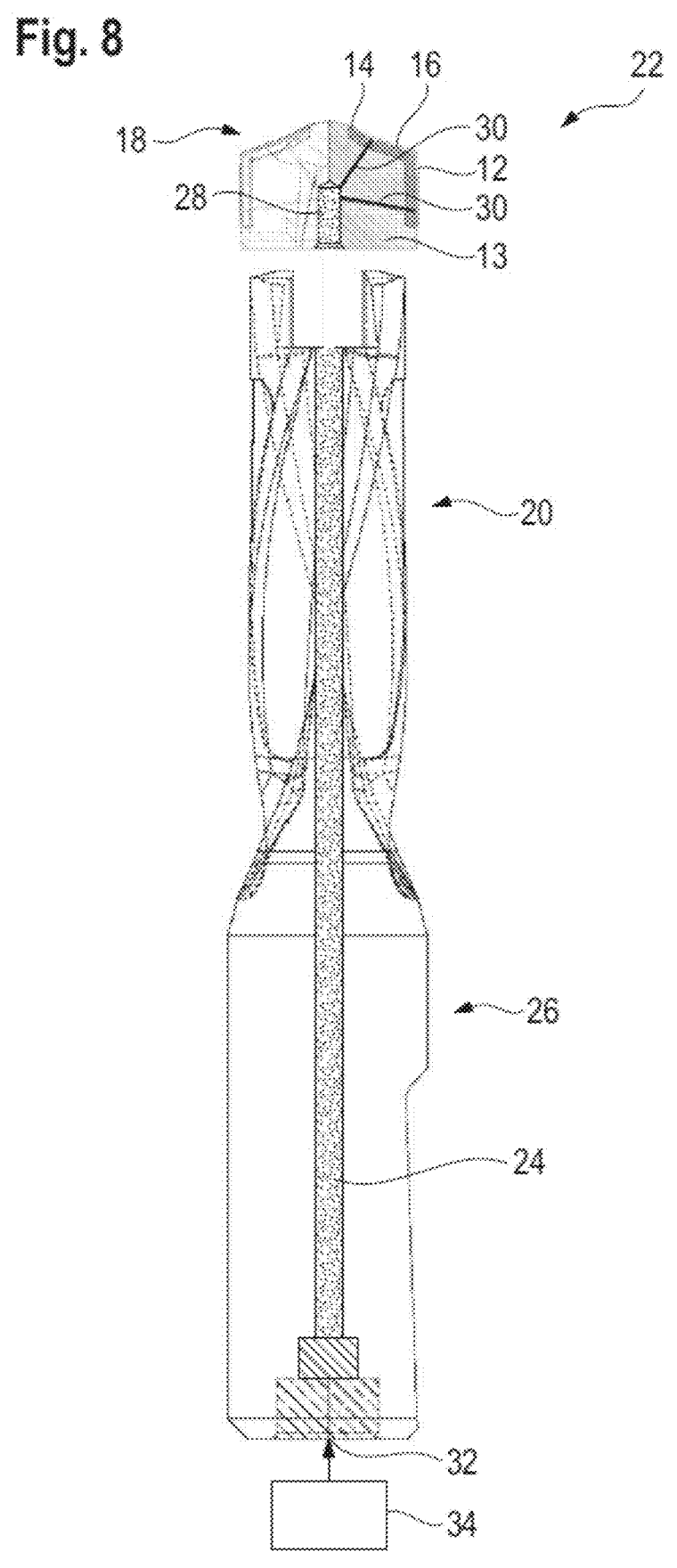

FIG. 8 shows a modular cutting tool 22.

The modular cutting tool 22 comprises a disposable drill head 18 that is attached to and engages with the shaft 20.

Moreover, the modular cutting tool 22 contains the same components as already described in FIG. 2. In this respect, reference is made to the descriptions of FIG. 2.

LIST OF REFERENCE NUMERALS

10 Cutting tool
12 Cavity
13 Cutting body
14 Outer contour
16 Wear layer
18 Drill head
20 Shaft
22 Modular cutting tool
24 Supply rod
26 Tool holder
28 Distribution chamber
30 Connecting channel

32 Inlet opening
34 Indicator source
d Thickness of the wear layer

The invention claimed is:

1. A cutting tool for the machining of a workpiece, the cutting tool comprising at least one cavity arranged in the cutting tool and spaced apart from an outer contour of the cutting tool by a wear layer, a thickness of the wear layer corresponding to a wear limit of the cutting tool, wherein an indicator substance comprising a colored substance in the cavity and is only visible when released through the wear layer at the wear limit of the cutting tool from the machining of the workpiece and is otherwise not visible.

2. The cutting tool according to claim 1, wherein the indicator substance is selected from the group consisting of dyes, pigments, carbon black, and luminescent paints, as well as combinations thereof.

3. The cutting tool according to claim 1, wherein the indicator substance is present in a liquid.

4. The cutting tool according to claim 1, wherein the cavity is configured as a channel.

5. The cutting tool according to claim 1, wherein the cavity is closed.

6. The cutting tool according to claim 1, wherein the cutting tool comprises at least one cutting edge and a cutting surface.

7. The cutting tool according to claim 6, wherein a cavity is in operative communication with the cutting edge and a cavity is in operative communication with the cutting surface, each cavity containing a different indicator substance.

8. The cutting tool according to claim 6, wherein a plurality of cutting edges and cavities are provided.

9. The cutting tool according to claim 6, wherein a plurality of cutting surfaces and a plurality of cavities are provided.

10. The cutting tool according to claim 1, wherein the cutting tool is modularly constructed and comprises a cutting insert, in which the cavity is provided.

11. The cutting tool according to claim 1, wherein the cutting tool is produced by a 3D printing process.

12. The cutting tool of claim 11, wherein the 3D printing process is binder jetting.

13. The cutting tool of claim 11, wherein the 3D printing process is selective laser melting.

14. The cutting tool of claim 1, wherein the cavity is porous.

15. The cutting tool of claim 1, wherein the cavity is honeycomb.

* * * * *